July 28, 1925.
C. J. STAUFFIGER
TRAP NEST
Filed July 30, 1923
1,547,460
2 Sheets-Sheet 1
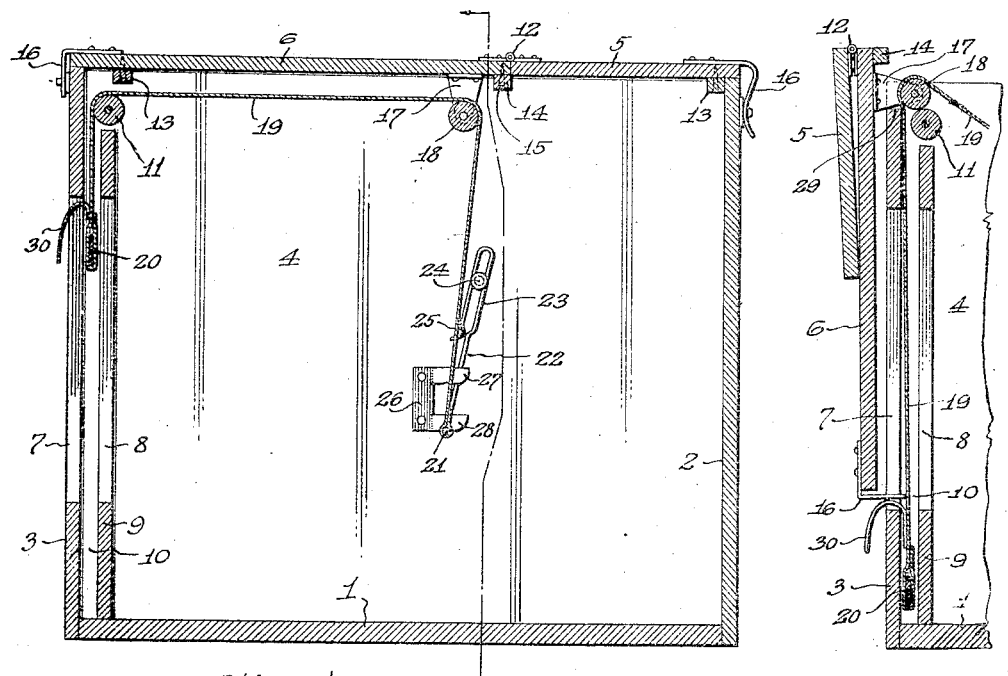
Fig. 1.
Fig. 3.
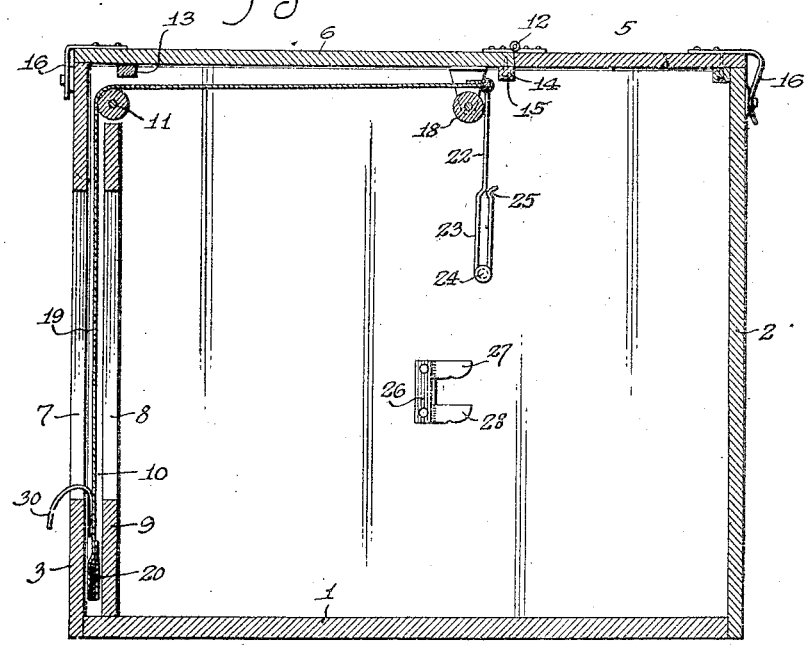
Fig. 2.
Inventor
Charles J. Stauffiger July 28, 1925.

C. J. STAUFFIGER

TRAP NEST

Filed July 30, 1923

Inventor
Charles J. Stauffiger

Patented July 28, 1925.

1,547,460

UNITED STATES PATENT OFFICE.

CHARLES J. STAUFFIGER, OF BUFFALO, NEW YORK.

TRAP NEST.

Application filed July 30, 1923. Serial No. 654,539.

*To all whom it may concern:*

Be it known that I, CHARLES J. STAUFFIGER, a citizen of the United States of America, residing at Buffalo, in the county of Erie and State of New York, have invented certain new and useful Improvements in Trap Nests, of which the following is a specification, reference being had therein to the accompanying drawings.

This invention relates to a trap nest of that class in which a hen may be entrapped to permit of an egg layer or non-productive hen being marked or otherwise identified, so that an accurate egg record may be maintained for each hen of a poultry flock.

My invention, in its broadest aspect, involves a gravity closure under which a hen must pass when seeking a nest, and either end of the closure is arranged to be engaged by the back, tail, plumage or upper portion of the hen to cause the closure to be tripped and lowered to close the trap nest. This is in contradistinction to closure tripping devices actuated by the weight of a fowl or by concealed means in or below a nest.

My invention further aims to provide a trap nest including a gravity closure with which novel keepers and invertible retaining members are associated, the keepers permitting of the closure being set for tripping by hens of various heights or sizes, and the retaining members permitting of the closure being easily manipulated and reset after each actuation.

My invention further aims to provide a trap nest housing with a sectional top or lid by which easy access may be had to the nest, the tripping mechanism within the housing, or the entire interior of the housing for cleansing purposes.

The above outlined features of my invention, together with preferred details of construction, will be hereinafter described by aid of my drawings, wherein—

Fig. 1 is a longitudinal sectional view of the trap nest set with the closure or curtain in an open position;

Fig. 2 is a similar view showing the trap nest "sprung" or the closure in a closed position;

Fig. 3 is a similar view of a portion of the nest housing with the lid fully open;

Figure 4:
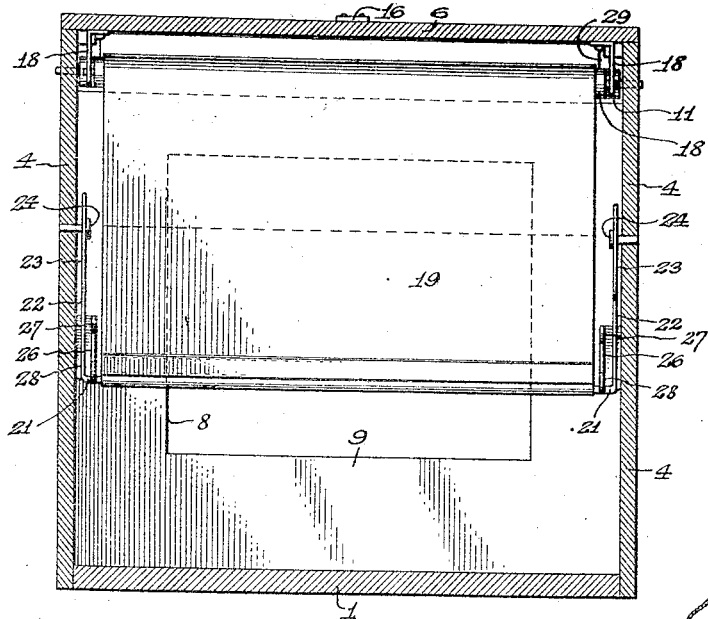
Fig. 4 is a cross sectional view of the trap nest.
Figure 5:
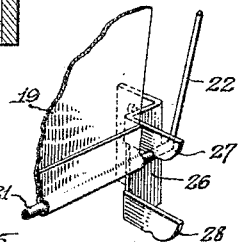
Fig. 5 is a detail perspective view of a keeper.
Figure 6:
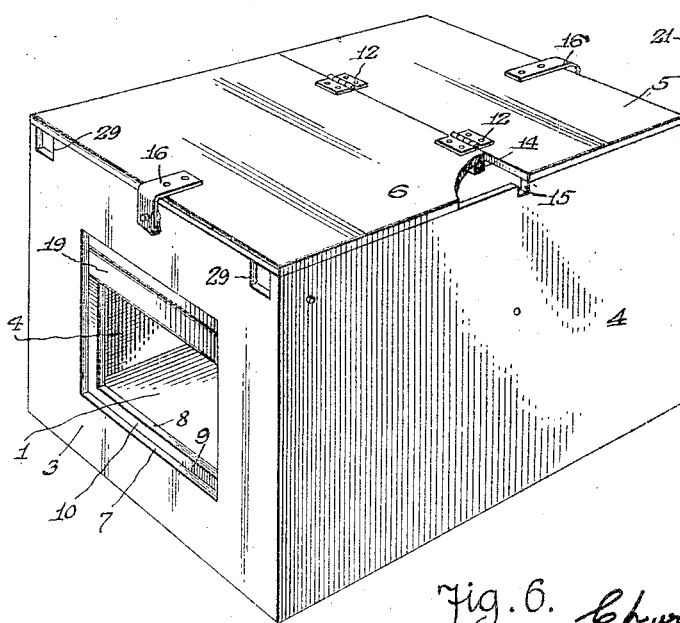
Fig. 6 is a perspective view of the trap nest.

The trap nest comprises a housing of box-like configuration made of wood, metal, or material easy to fabricate and retain in a sanitary condition.

The nest for a hen is made on a bottom wall or base 1 supporting a rear wall 2, a front wall 3 and side walls 4, all of these walls cooperating in supporting a sectional lid composed of sections 5 and 6.

The front wall 3 has an entrance opening 7 in alignment with a similar opening 8 in a transverse partition 9 parallel to the front wall 3 and connecting the side walls 4, so as to form a vertical closure way or well 10. The partition 9 is of less height than the front wall 3 to provide clearance for an antifrictional guide roller 11 having its pintles or spindle supported by the side walls 4.

The sectional lid has its sections 5 and 6 hingedly connected, as at 12, so that said sections may be folded one on the other, and with the section 5 smaller than the section 6, it may be conveniently opened for easy access to the housing, especially to obtain eggs from the nest. Both of the lid sections have positioning blocks 13 and a transverse cleat 14 on the lid section 6 is adapted to fit in notches 15 in the upper edges of the side walls 4 and assist in retaining the lid section 6 on said walls when the lid section 5 is opened or closed. Both lid sections have fasteners 16 of a conventional form engageable with the walls 2 and 3 to hold the sectional lid closed.

On the inner face of the lid section 6, adjacent its hinged edge, are depending brackets 17 for the pintles or spindle of a roller 18 which cooperates with the roller 11 in supporting a bodily shiftable flexible closure or curtain 19 corresponding to a door, gate or other member adapted to close the entrance openings 7 and 8 of the wall 3 and the partition 9 respectively. The closure is gravity closing by reason of a weight 20 or heavy lower edge and said closure is adapted to be manually raised and set in an open position. The upper or inner edge of the closure 19 has a casing for a transverse rod 21 forming part of a bail having side members 22 provided with loops 23 slidable on headed studs 24 carried by the side walls 4. The bail can be made of rigid wire and the oblong loops 23 shaped to afford spring ends 25 that may be sprung on the studs 24 or sprung to permit of the side members 22 being easily removed. These side members are invertible, as brought out in Figs. 1 and 2, and are automatically tripped and inverted by the closure 19 when said closure assumes a closed position.

On the side walls 4 are mounted keepers 26, each having under-notched arms 27 and 28 and either the arms 27 or 28 of the keepers 26 are adapted to be engaged by the ends of the rod 21, with the side members 22 between the keepers 26 and the side walls 4. The notched arms 27 and 28 are a few of a series of arms that may be employed to hold the inner end of the closure 19 at a desired elevation, relative to the bottom wall 1, so as to be engaged by hens of various sizes passing under the inner end of the closure.

The upper edge of the front wall 3 has slots or seats 29 adapted to receive the brackets 17 of the lid section 6 and said brackets permit of the folded lid being bodily suspended from the front wall 3 outside of the housing, as shown in Fig. 3. When in such position the closure 19 is closed and the rollers 11 and 18 close together, such being permissible by the shiftable side members 22 of the bail, and easy access can be had to the interior of the housing.

The weighted edge of the closure 19 may have a tab 30 to facilitate raising from the front of the housing.

Considering Fig. 1, showing the closure 19 set, and the trap nest open, it will be noted that the bail is at an inclination to the vertical and in engagement with the lower arms 28 of the keepers 26. In order for a hen to reach the nest she must pass first under the front end of the closure and in so doing contact with the end of the closure 19, causing the inner end of the closure to shift towards the vertical, out of engagement with the arms 28, thus permitting the closure 19 to close by gravity and confine the hen within the trap nest until the nest is examined, the hen identified, and such data collected as desired.

Should the hen pass under the front end of the closure without actuating it, the hen will undoubtedly encounter the inner end of the closure and cause it to close, consequently there is positive assurance of the hen being trapped.

The closure may be raised to release the hen, either at the front of the housing or through the top thereof, and with the lid section 5 open the closure may be reset for the next laying.

The trap nests may be arranged in a battery or stacked formation, and it is to be understood that the construction is susceptible to such changes as are permissible by the appended claims.

Having thus fully described my invention, what I claim is:—

1. A trap nest housing having an entrance and a flexible closure for the housing entrance, and invertible and slidable members adapted for defining an open or closed position of said closure, said invertible members being substantially perpendicular on the sides of said housing and completely invertible and operatable independent of any nest in said housing.

2. A trap nest housing, as called for in claim 1, wherein said closure is in the form of a curtain having one end weighted and said invertible members attached to the opposite end of said closure.

3. A closure for a trap nest comprising a flexible door, means for holding said flexible door in an operative relation with respect to the trap nest, keepers in said trap nest and invertible members engaging said keepers and holding said door normally open, said invertible members being tripped and automatically inverted when one end of said flexible door is released by a hen entering the trap nest to cause the flexible door to close.

4. A trap nest comprising a housing, means in said housing for trapping a hen therein, and a sectional lid for said housing, said lid being composed of hinge sections one of which supports a portion of said trapping means and permits of said lid being supported in an open position suspended in front of said housing.

5. A trap nest comprising a housing, a guard therein providing a closure way, said housing having an entrance to the nest and said guard having an opening aligning with the housing entrance, a flexible closure adapted to be raised and lowered in said closure way, means slidable on walls of said housing holding said closure raised and adapted to be tripped by a hen passing under said closure, and means to cause the first mentioned means to be inverted when tripped and said closure lowered.

6. A trap nest comprising a housing having an entrance, a gravity closing curtain for the housing entrance, and means for holding the inner end of said curtain at various heights relative to a nest in said housing so that hens of various heights may contact with the inner end of said curtain and trip said means to release said curtain.

7. A trap nest as called for in claim 7 wherein said means includes keepers at the sides of said housing and members engageable with said keepers and adapted to slip therefrom.

8. A trap nest including a housing having an entrance, and a curtain for said housing entrance, said curtain having its ends arranged for a hen to pass thereunder and contact with either end to cause said curtain to be released to close said housing entrance.

9. In a trap nest housing having an entrance through which a hen must pass to reach the nest in said housing, a curtain adapted to close the housing entrance and a bail carried by said curtain adapted to be temporarily held by the walls of said housing to retain the curtain open, said bail being in position to be tripped by a hen contacting with the bail so that said curtain may close.

10. A trap nest comprising a housing having an entrance, a flexible closure for the housing entrance, means at one end of said closure for holding it open, said means being arranged to be tripped by actuation of the opposite end of the closure.

11. A trap nest comprising a housing having an entrance, and a closure for the housing entrance, said closure being arranged to be bodily actuated at one or the other of two spaced apart places, one adjacent the front of the housing and the other in the middle portion of the housing.

12. A trap nest as called for in claim 11 wherein said closure has ends adjustable for contact by hens of different sizes.

In testimony whereof I affix my signature in presence of two witnesses.

CHARLES J. STAUFFIGER.

Witnesses:
GEO. T. VANDEMEULEN,
HELEN ROLL.